Patented July 29, 1930

1,771,557

UNITED STATES PATENT OFFICE

JAN HENDRIK DE BOER, OF EINDHOVEN, NETHERLANDS, ASSIGNOR TO N. V. PHILIPS' GLOEILAMPENFABRIEKEN, OF EINDHOVEN, NETHERLANDS

PROCESS OF CONVERTING HAFNIUM AND ZIRCONIUM SALTS

No Drawing. Application filed October 18, 1924, Serial No. 744,487, and in the Netherlands November 15, 1923.

The following process is very suitable for working hafnium and zirconium ores in order to obtain hafnium and zirconium:

The ores are treated with some flux whereupon to the hafnium and zirconium salts which are dissolved in a medium that contains a concentrated acid is added for example phosphoric acid. Whereas the phosphates of the metals present in the ores besides hafnium and zirconium are soluble in concentrated acid, hafnium and zirconium phosphates are insoluble in the same. So it is possible by simple filtration to obtain the said hafnium and zirconium compounds together in a pure state.

However, the phosphates of hafnium and zirconium are now found to be unsuitable to serve as a basis for the separation of the two metals, since the two phosphates are practically insoluble even in concentrated acid, although the difference of their solubility is very perceptible.

Hafnium and zirconium can be isolated together from their ores not only in the form of phosphates but also in the form of phosphites or arsenates or arsenites or antimonates or antimonites.

The invention has for its object to work out a process that permits of converting the said salts into other compounds adapted to serve as a basis for a separation of hafnium and zirconium.

By the process according to the invention one or more phosphates, phosphites, arsenates, arsenites, antimonates and antimonites of hafnium or zirconium or of both metals are converted into soluble hafnium and zirconium compounds in a medium that contains free hydrofluoric acid.

According to the invention it is possible after thus converting one or more of the said salts of hafnium or zirconium or of both metals into soluble hafnium and zirconium compounds to precipitate hafnium oxide and zirconium oxide by adding a base or a basicly reacting substance of sufficiently high concentration in hydroxyl ions.

The invention will be more clearly understood by reference to an example:

If an ore containing zirconium or hafnium is started from, the zirconium or hafnium may be converted, for example with the aid of chlorine and carbon or of sodium bisulphate, into a soluble form, namely into zirconium and hafnium chlorides or sulphates. They are then filtered off from that part of the ore that has remained undissolved (silicic acid, niobic acid, tungstenic acid, molybdenic acid etc.). To the filtrate is added orthophosphoric acid and an excess of hydrochloric acid. In this case, exclusively insoluble zirconium and hafnium phosphates will precipitate, said phosphates being washed out by repeated decantation or filtration. The said phosphates are introduced into hydrofluoric acid, into a bifluoride or in general into a liquid that contains free hydrofluoric acid. Thus the phosphates are brought into solution whilst forming complex compounds. This solution may then be poured into a base, for example into aqua ammonia, in general into a liquid that reacts alkalinely to a sufficient extent for precipitating hafnium and zirconium oxides. The said oxides may serve as starting point for the separation of zirconium and hafnium or with the aid of a bifluoride they may be converted into double fluorides, which may be used for the separation of zirconium and hafnium. If in precipitating aqua ammonia has been used as a base, it will be advisable to choose likewise an ammonium compound as double fluoride in order that the zirconium and hafnium are contaminated by as few as possible different admixtures.

What I claim is:

1. The process which consists in treating a mixture of hafnium and zirconium salts that can be derived from the at least trivalent oxides of the elements of the second column of the 5th group with the exception of nitrogen and bismuth, with a medium that contains free hydrofluoric acid, the said salts being converted thereby into soluble hafnium and zirconium compounds.

2. The process which consists in introducing into the solution of a mixture of hafnium and zirconium compounds, that can be obtained by treating a mixture of hafnium and zirconium salts, derivable from the at least trivalent oxides of the elements of the second column of the 5th group with the exception of nitrogen and bismuth, with a medium containing free hydrofluoric acid, an alkaline substance of sufficiently high concentration of hydroxyl ions, one of the oxides of hafnium and zirconium being precipitated thereby.

In testimony whereof I affix my signature, at the city of Eindhoven, this 22nd day of September, 1924.

JAN HENDRIK DE BOER.